Jan. 28, 1958  S. T. A. RICHARDS  2,821,298
METHOD AND MEANS FOR TEMPORARILY STOPPING LEAKAGE
Filed April 7, 1954  2 Sheets-Sheet 1

Inventor
S. T. A. Richards

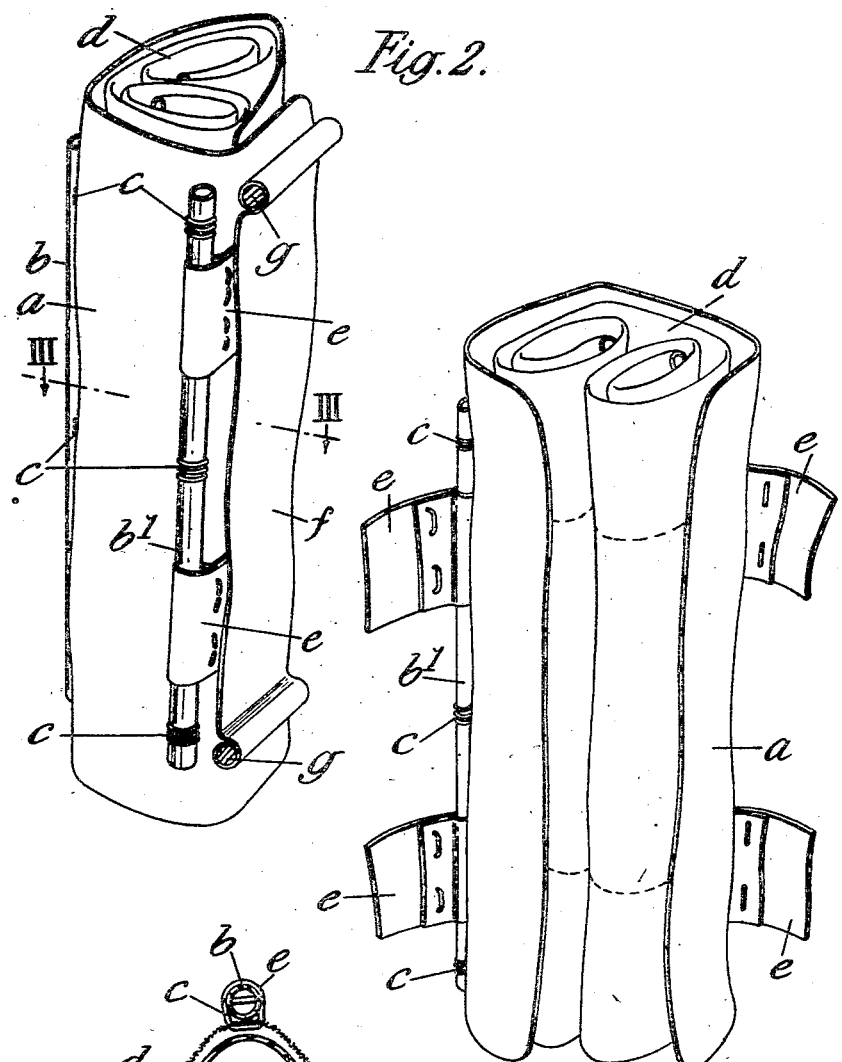
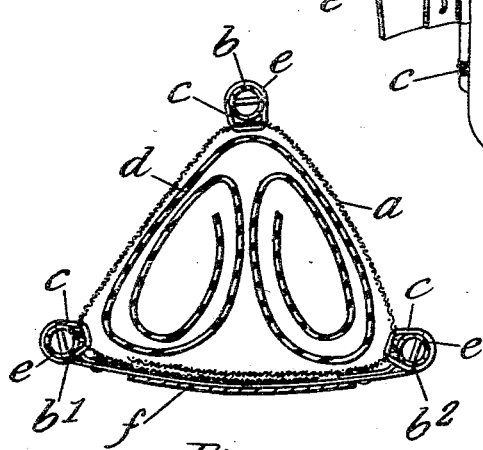

United States Patent Office 2,821,298
Patented Jan. 28, 1958

2,821,298

METHOD AND MEANS FOR TEMPORARILY STOPPING LEAKAGE

Stanley Thomas Albert Richards, Yeovil, England, assignor to Normalair Limited, Yeovil, England Application April 7, 1954, Serial No. 421,610

4 Claims. (Cl. 206—47)

This invention relates to puncture sealing devices for aircraft pressure cabins and the like and has for its object to provide a method of and means for arresting loss of internal pressure from such pressurised spaces and means of regaining pressure in the event of puncturing of the walls thereof.

The invention consists in devices and methods for stopping outward leakage from a pressurised metal chamber, e. g. an aircraft pressure cabin, due to a punctured wall, as set forth in the claims appended hereto.

Referring to the accompanying diagrammatic drawings:

Figure 2 is a similar view of the device in rolled position.

Figure 3 is a cross-sectional view on the line III—III of Figure 2.

Figure 4 is a perspective view with the device partly unrolled.

Figure 1:
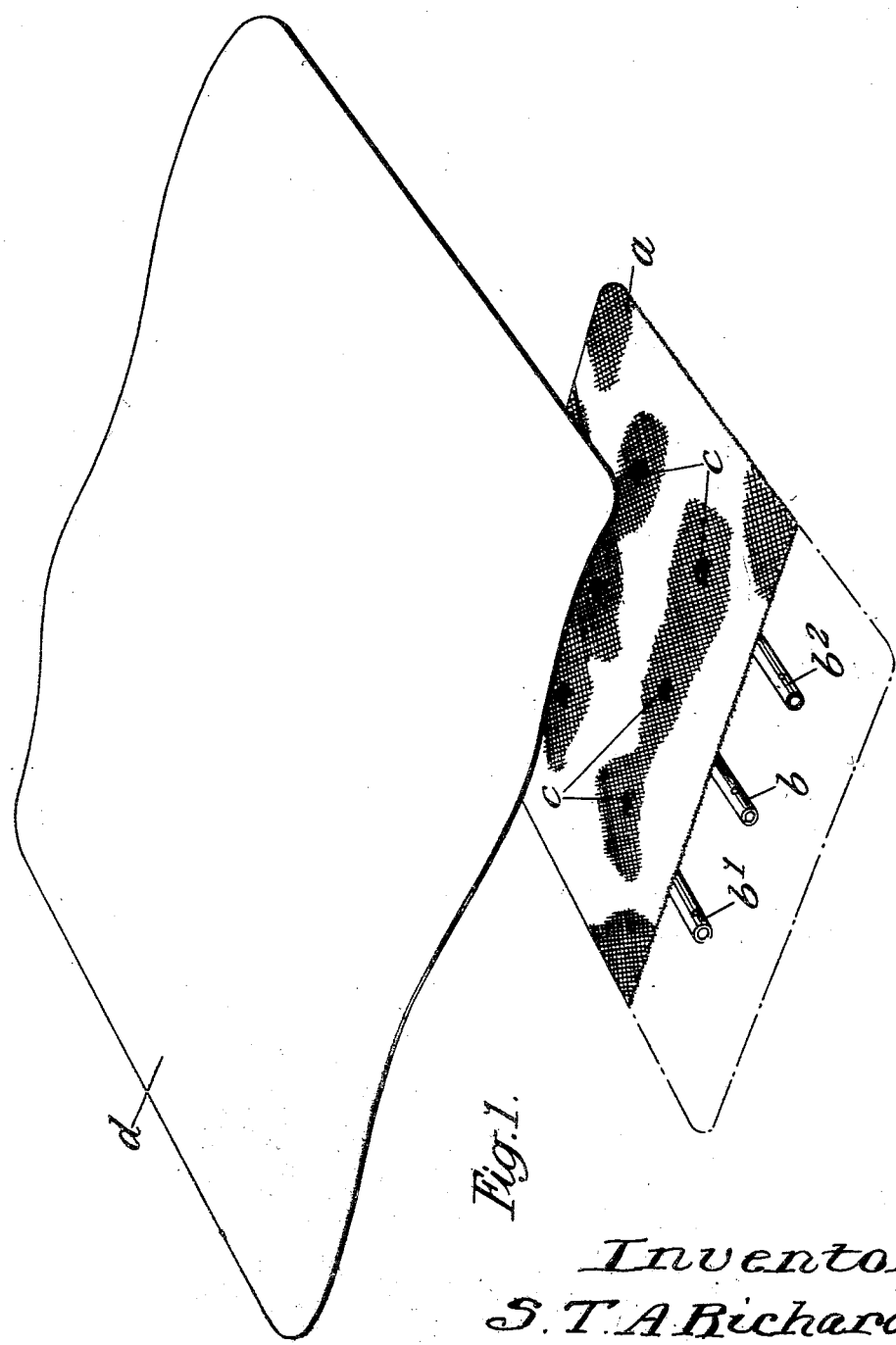
Figure 1 is a perspective view of one convenient form of leak-stopping device in unrolled position embodying the present invention.

In carrying the invention into effect according to one form illustrated by way of example in Figures 1–4 as applied to a leak stopper for aircraft pressure cabins, a sheet of copper gauze $a$ of 40 mesh made from 35 S. W. G. wire is provided, the gauze conveniently being 9″ square. Sewn to the one surface of the gauze is a 7¾″ length of $\frac{5}{16}$″ steel tube $b$ of, say, 18 S. W. G. This tube is disposed centrally on one side of the gauze and parallel to it are spaced a pair of similar 7¾″ tubes $b^1$, $b^2$ disposed at a distance of 1¾″ one on each side of the central tube; these tubes are also stitched to the gauze at $c$. A thin sheet of rubber-proofed fabric sheeting $d$, say 16″ by 16″ is also provided for use in conjunction with the gauze, as explained below.

In order to make the leak stopper as compact and convenient as possible, two opposite edges of the proofed sheeting to a depth of say 3½″ are folded inwards and then the folded sheet is rolled up from each of the two other sides and the gauze is then bent around the rolled sheeting and the two sides brought across so that one overlaps the other by about 2″ as shown in Figures 2 and 3.

In order to prevent the gauze unwrapping, 2″ tabs $e$ of fabric are fixed to the tubes $b^1$ and $b^2$, these tabs being of such length as just to meet one another on the centre line when the appliance is rolled. An adhesive strip of paper or linen $f$ is then laid longitudinally over these tabs, thus uniting them in pairs and forming the leak stopper into a compact and convenient unit. The adhesive strip can have each end formed complete with a curl over a ¼″ piece of wood $g$ so as to enable the member of the crew to grip it easily thus permitting the gauze etc. to be unwrapped.

In operation, in the event of a puncture in the aircraft skin, the middle tube $b$ of the folded appliance is laid across the aperture with the said tube in contact with the inside of the aircraft skin near the centre of the orifice, the adhesive strip $f$ is pulled off and the gauze $a$ is folded down against the skin until it lies flat or lies snugly wrapped around any longitudinal stringers, cross members or inwardly bent plates or the like, the three tubes $b$, $b^1$ and $b^2$ supporting the gauze and preventing it from being blown through the hole.

If desired, the edges or corners of the gauze are then folded to the contour of the structure. The two side rolls of the apron $d$ are then readily unrolled into place against the inner face of the gauze. As the unfolding proceeds the proofed fabric will be vigorously sucked against the gauze and held firmly in position.

If the initial application of the proofed fabric is not sufficient adequately to cover the gauze, the former may be partly unwrapped and rearranged.

The proofed fabric sheeting may, if desired, be substituted by other suitable material such as plain rubber or plastic sheeting, or alternatively, thin expanded rubber having non-interconnected cells may be used.

Although it is convenient to have the reinforced gauze separate from the air-tight sheeting it would be possible to unite the two, say along one centre line and thus avoid having separate portions. The gauze could still be laid out by hand before the air-tight sheet was spread on its inner surface. With a view to assisting the application of the gauze in the darkness the edges of the gauze could be outlined with luminous or fluorescent material and ultra-violet light could be used. If the gauze is merely sheared, damage to the hand or gloves could be caused by the individual wires. This difficulty can be overcome by burning the outline of the gauze as by an oxy-acetylene torch and smoothing any droplets which may form.

Holes considerably larger than 4″ square could be sealed by the foregoing method, for instance, light alloy tubes, say, up to 1″ diameter could be secured to the gauze and might be applied to a window opening. It is likely that the gauze would have to extend, say 1½″ or 2″ beyond the end of the tubes to give reasonable support for the air-tight inner sheet.

A leak stopper as described above for sealing the 4″ x 4″ jagged hole weighed .7 lb. and withstood 14 lb./sq. inch differential without damage to the gauze or proofed fabric.

In practice leak stoppers constructed as described above have reduced the air flow to a negligible amount.

In an alternative arrangement, strips of, say, 4″ wide of proofed fabric may be substituted for the single sheet apron referred to above. If desired, the proofed fabric may be secured to the aircraft skin by adhesive strips, e. g. crepe paper, which can conveniently be cut into strips and made available for rapid use.

In addition to further securing the proofed fabric, such adhesive paper or adhesive fabric may be employed to seal any small remaining leaks. Any holes, e. g. openings in channel members may easily be sealed by means of small sheets of proofed fabric. If desired, Duralumin gauze and/or Duralumin tubes may be employed and rods may be substituted for the tubes.

In certain cases it may be advantageous to use more than one gauze mat, possibly partially overlapping them or having the bars angularly displaced relatively to one another.

Where it is impossible to apply the leak stopper by hand due to inaccessibility, the reinforced gauze may be pushed approximately in place and the air-tight sheeting allowed to be sucked against the gauze. This sheeting might conveniently be in strip form, or even in small pieces. Some form of rapidly drying adhesive might then be sprayed on.

According to another form of leak stopper embodying the present invention, a 9″ square of gauze having three $\frac{5}{16}$″ steel tubes secured to its outer face has the rubber proofed fabric apron sheeting stuck to the gauze along its length and over the width of ⅜" adjacent to its centre line.

Alternative forms may include tubes which are not circular.

I claim:
1. Method of making a device for temporarily stopping outward leakage from an inhabitable pressurised metal chamber due to a punctured chamber wall, which comprises attaching at least one bend-resisting rib to a sheet of gauze, forming a sheet of flexible impervious material into a roll, folding said sheet of gauze round the rolled flexible material so that the edges overlap one another, and securing the overlapped edges together so as to form a leak-stopping device which can be unrolled over a puncture in a chamber wall to form a sheet of gauze with a sheet of impervious material superimposed thereon.

2. Method of making a device for temporarily stopping outward leakage from an inhabitable pressurised metal chamber due to a punctured chamber wall which comprises attaching a plurality of bend-resisting ribs to a sheet of gauze, forming a sheet of flexible impervious material into a double roll by rolling the opposite edges thereof towards one another, folding said sheet of gauze round the rolled flexible impervious material so that the edge parts overlap one another, and securing the overlapped parts together so as to form a leak-stopping device which can be unrolled over a puncture in a chamber wall to form a sheet of gauze with a sheet of impervious material superimposed thereon.

3. Device for temporarily stopping outward leakage from an inhabitable pressurised metal chamber due to a punctured chamber wall, comprising a sheet of flexible impervious material formed into a roll and a sheet of gauze having at least one bend-resisting rib attached thereto folded round said roll of impervious material to form therewith a composite unit, the edges of said sheet of gauze overlapping one another and the overlapping parts being secured together.

4. Device for temporarily stopping outward leakage from an inhabitable pressurised metal chamber due to a punctured chamber wall, comprising a sheet of flexible impervious material formed into a double roll by rolling its opposite edges towards one another, a sheet of gauze having a plurality of spaced parallel bend-resisting ribs attached thereto folded round said roll of impervious material with the edges of the gauze overlapping one another, flexible tabs on the ribs nearest the edges of the gauze, and removal means for securing the tabs associated with the two ribs together.

References Cited in the file of this patent
UNITED STATES PATENTS

| | | |
|---|---|---|
| 1,107,680 | Lucka | Aug. 18, 1914 |
| 1,307,040 | Christensen | June 17, 1919 |
| 1,341,121 | Gates | May 25, 1920 |
| 2,127,871 | Kozloff | Aug. 23, 1938 |
| 2,412,972 | Dean | Dec. 24, 1946 |
| 2,421,096 | Vogt | May 27, 1947 |
| 2,526,389 | Montefalco | Oct. 17, 1950 |
| 2,548,467 | Crise | Apr. 10, 1951 |

FOREIGN PATENTS

| | | |
|---|---|---|
| 358,516 | France | Dec. 22, 1905 |
| 711,434 | Great Britain | June 30, 1954 |

OTHER REFERENCES

"Repairing Reinforced Plastics," article by S. S. Oleesky published in "Modern Plastics," February 1952, pp. 99, 100, 102, 104–106.